United States Patent
Takao et al.

(10) Patent No.: US 10,990,729 B2
(45) Date of Patent: Apr. 27, 2021

(54) VERIFICATION-PROCESSING DEVICE, LOGIC-GENERATING DEVICE, AND VERIFICATION-PROCESSING METHOD

(71) Applicant: MITSUBISHI HEAVY INDUSTRIES ENGINEERING, LTD., Yokohama (JP)

(72) Inventors: Kenji Takao, Tokyo (JP); Keita Hirayama, Tokyo (JP); Noritaka Yanai, Tokyo (JP)

(73) Assignee: MITSUBISHI HEAVY INDUSTRIES ENGINEERING, LTD., Yokohama (JP)

( * ) Notice: Subject to any disclaimer, the term of this patent is extended or adjusted under 35 U.S.C. 154(b) by 0 days.

(21) Appl. No.: 16/959,594

(22) PCT Filed: Jan. 17, 2019

(86) PCT No.: PCT/JP2019/001247
§ 371 (c)(1),
(2) Date: Jul. 1, 2020

(87) PCT Pub. No.: WO2019/142858
PCT Pub. Date: Jul. 25, 2019

(65) Prior Publication Data
US 2020/0387656 A1 Dec. 10, 2020

(30) Foreign Application Priority Data
Jan. 17, 2018 (JP) .............................. JP2018-005995

(51) Int. Cl.
*G06F 30/3308* (2020.01)
*G01R 31/52* (2020.01)
*G06F 119/02* (2020.01)

(52) U.S. Cl.
CPC ......... *G06F 30/3308* (2020.01); *G01R 31/52* (2020.01); *G06F 2119/02* (2020.01)

(58) Field of Classification Search
CPC . G06F 30/3308; G06F 2119/02; G01R 31/52; G01R 31/317
See application file for complete search history.

(56) References Cited

U.S. PATENT DOCUMENTS 5,126,956 A * 6/1992 Komiya ............... G05B 19/056
                                                         700/180
5,623,401 A * 4/1997 Baxter .................. G05B 19/05
                                                          700/18

(Continued)

FOREIGN PATENT DOCUMENTS

JP    2008-071135 A    3/2008
JP    4398703 B2       1/2010

(Continued)

OTHER PUBLICATIONS

PCT/ISA/210, "International Search Report for International Application No. PCT/JP2019/001247," dated Apr. 2, 2019.

(Continued)

*Primary Examiner* — Nha T Nguyen
(74) *Attorney, Agent, or Firm* — Manabu Kanesaka; Kenneth Berner; Benjamin Hauptman

(57) ABSTRACT

The verification-processing device includes an acquisition unit that is configured to acquire a circuit logic model represented by an evaluation expression represented by a logical expression taking as variables, a relay, an element, and a connection line that form a relay logic circuit to be verified, the evaluation expression including at least a logical expression for a case where a failure event occurs in the relay logic circuit; and a determination unit that is configured to determine the logical state of an output of the relay (Continued)

when a failure event occurs in the element or the connection line, based on the circuit logic model.

9 Claims, 10 Drawing Sheets

(56) References Cited

U.S. PATENT DOCUMENTS

| | | | | |
|---|---|---|---|---|
| 5,777,869 | A * | 7/1998 | Welch | G05B 19/056 700/18 |
| 2006/0155393 | A1 * | 7/2006 | Klein | G05B 19/056 700/18 |
| 2008/0072195 | A1 | 3/2008 | Mukaiyama | |
| 2009/0086643 | A1 * | 4/2009 | Kotrla | H04L 43/16 370/248 |
| 2010/0088656 | A1 | 4/2010 | Mukaiyama | |
| 2015/0344050 | A1 | 12/2015 | Yanai et al. | |
| 2016/0204703 | A1 * | 7/2016 | Ishigaki | H02M 3/18 307/43 |

FOREIGN PATENT DOCUMENTS

| | | |
|---|---|---|
| JP | 5233355 B2 | 7/2013 |
| JP | 2014-139052 A | 7/2014 |
| JP | 6139670 B2 | 5/2017 |

OTHER PUBLICATIONS

PCT/ISA/237, "Written Opinion of the International Searching Authority for International Application No. PCT/JP2019/001247," dated Apr. 2, 2019.

* cited by examiner (a) A = B and C and Power_100V (b) A = Line113
   or (B and Line112)
   or (B and C and Line111)
   or (B and C & Power_100V)

(c) A = (Line113 and DC_Line113)
   or (B and (Line112 and DC_Line112))
   or (B and C and (Line111 and DC_Line111))
   or (B and C and & Power_100V)

FIG. 5

```
1: [  Module main
2: [  VAR
        Switch_B: boolean;
        Switch_C: boolean;
        ...
3: [  DEFINE
        Line111: TRUE;
        ...
4: [  ASSIGN
        init(Relay_C): =False;
        next(Relay_C): =Switch_B and Switch_Cand Line111 & Power_100V;
        ...
5: [  SPEC
        !EF(ProcessX=TRUE     &   Relay_C=FALSE)
```

FIG. 8

| POWER SUPPLY UNIT | BREAKER | CONNECTOR PART | CONNECTION POINT |
|---|---|---|---|
| P1(100V) | Breaker | C_2 | VOL_100_2 |
| – | – | C_2 | VOL_100_1 |
| P2(4V_1) | R11 | C_1 | 111 |
| P3(4V_2) | R10 | C_1 | 211 |

FIG. 9

| No. | Device | COMMON | b-CONTACT | a-CONTACT |
|---|---|---|---|---|
| 1 | R1 | 113 | | G_100E1 |
| 2 | R2 | 111 | | G_100E1 |
| 3 | R3 | 213 | | G_100E1 |
| 4 | R4 | 211 | | G_100E1 |
| 5 | SW_1 | 112 | | 113 |
| 6 | SW_2 | 111 | | 112 |
| 7 | Diode_121 | 121 | 111 | |
| 8 | SW_3 | VOL_100_1 | | 121 |
| 9 | SW_4 | 212 | | 213 |
| 10 | SW_5 | 211 | | 212 |
| 11 | Diode_221 | 221 | 211 | |
| 12 | SW_6 | VOL_100_2 | | 221 |
| 13 | C_1 | 111 | 211 | |
| | ⋮ | ⋮ | ⋮ | ⋮ |

FIG. 11

| No. | Device | COMMON | b-CONTACT | a-CONTACT |
|---|---|---|---|---|
| 1 | R1 | 113 | | G_100E1 |
| 2 | R2 | 111 | | G_100E1 |
| 3 | R3 | 213 | | G_100E1 |
| 4 | R4 | 211 | | G_100E1 |
| 5 | SW_1 | 112 | | 113 |
| 6 | SW_2 | 111 | | 112 |
| 7 | Diode_121 | 121 | 111 | |
| 8 | SW_3 | VOL_100_1 | | 121 |
| 9 | SW_4 | 212 | | 213 |
| 10 | SW_5 | 211 | | 212 |
| 11 | Diode_221 | 221 | 211 | |
| 12 | SW_6 | VOL_100_2 | | 221 |
| 13 | C_1 | 111 | 211 | |
| | ⋮ | ⋮ | ⋮ | ⋮ |

FIG. 12

| No. | Device | COMMON | b-CONTACT | a-CONTACT |
|---|---|---|---|---|
| 1 | R1 | 113 | | G_100E1 |
| 2 | R2 | 111 | | G_100E1 |
| 3 | R3 | 213 | | G_100E1 |
| 4 | R4 | 211 | | G_100E1 |
| 5 | SW_1 | 112 | | 113 |
| 6 | SW_2 | 111 | | 112 |
| 7 | Diode_121 | 121 | 111 | |
| 8 | SW_3 | VOL_100_1 | | 121 |
| 9 | SW_4 | 212 | | 213 |
| 10 | SW_5 | 211 | | 212 |
| 11 | Diode_221 | 221 | 211 | |
| 12 | SW_6 | VOL_100_2 | | 221 |
| 13 | C_1 | 111 | 211 | |
| | ⋮ | ⋮ | ⋮ | ⋮ |

FIG. 13

(a)
R1=((DC_113) & SW_1 & (DC_112) & SW_2 & Line111)
|(Line113)|(SW_1 & Line112)

(b)
R2=(Lime111)
|(!Diode_121 & Line121)

(c)
R3=((DC_213) & SW_4 & (DC_212) & SW_5 & Line211)
|(Line213)
|(SW_4 & Line212)

(d)
R4=(Line211)
|(!Diode_221 & Line221)

(e)
Line111=111_temp
|(!C_1 & Line211)
|(!C_1 & (DC_211) & !Diode_221 & (DC_221) & SW_6 & VOL_100_2)
|(!Diode_121 & (DC_121) & SW_3 & VOL_100_1)
|(SW_2 & SW_1 & Line113)
|(SW_2 & Line112)
|(!Diode_121 & Line121)

(f)
Line211=(211_temp)
|(!Diode_221 & (DC_221) & SW_6 & VOL_100_2)
|(!C_1 & Line111)
|(!C_1 & (DC_111) & !Diode_121 & (DC_121) & SW_3 & VOL_100_1)
|(SW_5 & SW_4 & Line213)
|(SW_5 & Line212)
|(!Diode_221 & Line221)

VERIFICATION-PROCESSING DEVICE, LOGIC-GENERATING DEVICE, AND VERIFICATION-PROCESSING METHOD

Priority is claimed on Japanese Patent Application No. 2018-005995, filed on Jan. 17, 2018, the content of which is incorporated herein by reference.

TECHNICAL FIELD

The present invention relates to a verification-processing device, a logic-generating device, and a verification-processing method.

BACKGROUND ART

In the related art, relay logic circuits using relays have been used in various control systems. The verification of the basic operation of the relay logic circuit is performed by a verification-processing device such as a circuit simulator, and the reliability of its logical operation is ensured. However, it may be difficult to perform the verification in the case of occurrence of a failure such as unintentional contact with a connection line or the like in the relay logic circuit or a failure of an element forming the circuit, because there are many events to be assumed.

Patent Literature 1 describes that a formal method typified by a model inspection method is used when designing a semiconductor LSI circuit and verifying functional requirements to be achieved by the semiconductor LSI circuit.

CITATION LIST

Patent Literature

Patent Literature 1

Japanese Unexamined Patent Application, First Publication No. 2008-71135

SUMMARY OF INVENTION

Technical Problem

According to the above-described Patent Literature 1, it is disclosed that the performance inspection of the basic function to be achieved in normal time is performed by verifying the functional requirement to be achieved by the circuit, but there is no disclosure about checking whether safety is secured when a failure event occurs, different from normal time.

The present invention has been made in view of the above circumstances, and an object is to provide a verification-processing device, a logic-generating device, and a verification-processing method, capable of verifying safety when a failure event occurs in a relay logic circuit using a relay.

Solution to Problem

The following configuration is adopted to solve the above problems.

According to a first aspect of the present invention, a verification-processing device includes an acquisition unit that is configured to acquire a circuit logic model represented by an evaluation expression in which a relay logic circuit of a verification target is represented by a logical expression taking as variables, variables corresponding to a relay, an element, and a connection line that form the relay logic circuit, the evaluation expression including at least the logical expression for a case where a failure event occurs in the relay logic circuit; and a determination unit that is configured to determine a logical state of an output of the relay when a failure event occurs in the element or the connection line, based on the circuit logic model.

With such a configuration, it is possible to acquire a circuit logic model represented by an evaluation expression in which a relay logic circuit of the verification target is represented by a logical expression taking as variables, variables corresponding to a relay, an element, and a connection line that form the relay logic circuit, the evaluation expression including at least the logical expression for a case where a failure event occurs in the relay logic circuit. Therefore, it is possible to acquire the circuit logic model represented by the evaluation expression including the logical expression when the failure event occurs in the relay logic circuit. Further, it is possible to determine a logical state of an output of the relay when a failure event occurs in the element or the connection line, based on the circuit logic model.

Therefore, in the relay logic circuit using the relay, it is possible to verify the safety when a failure event occurs.

According to a second aspect of the present invention, in the verification-processing device according to the first aspect, in the variables of the logical expression, conductive states of an element and a connection line on a path of the verification target are indicated by positive logic, and the logical expression when the failure event occurs includes a logical expression that indicates an AND operation of a variable indicating the element on the path of the verification target and a variable indicating the connection line on the path of the verification target.

With such a configuration, the disconnection of the connection line can be represented by a logical expression, and the safety when a failure event occurs due to the disconnection of the connection line can be verified.

According to a third aspect of the present invention, in the verification-processing device according to the first aspect, the evaluation expression of the relay included in the relay logic circuit of the verification target is described such that an operation result of the evaluation expression of the relay is a value of the variable of the relay.

With such a configuration, the failure of the element can be represented by a logical expression, and the safety when a failure event occurs due to the failure of the element can be verified.

According to a fourth aspect of the present invention, in the verification-processing device according to the third aspect, in the variables of the logical expression, conductive states of an element and a connection line on a path of the verification target are indicated by positive logic, and the evaluation expression of the relay includes: a first expression and a second expression; and an OR operation of the first expression and the second expression. The first expression includes an AND operation of a variable indicating the element and a variable indicating the connection line on the path provided with the relay, and the second expression uses elements and connection lines of the path provided with the relay as analysis targets, the elements being at a point where a short circuit can occur on the path or the elements being on a path between connection lines and the relay, and includes an AND operation of variables indicating the elements which are the analysis targets and variables indicating the connection lines which are the analysis targets.

With such a configuration, the short circuit of the element can be represented by a logical expression, and the safety when a failure event occurs due to the short circuit of the element can be verified.

According to a fifth aspect of the present invention, in the verification-processing device according to the fourth aspect, the path provided with the relay is a path formed so as to be connectable between a power supply line to which a control voltage of the relay is applied and a ground electrode for the power supply line.

With such a configuration, the configuration of the predetermined path formed so as to be connectable between the power supply line and the ground electrode can be represented by a logical expression, and the safety when a failure event occurs in the predetermined path can be verified.

According to a sixth aspect of the present invention, the verification-processing device according to any one of the first to fifth aspects further includes a logic generation unit that is configured to generate the circuit logic model, based on an element list which associates the element and the connection line with each other and which stores data related to an element or a connection line connected to a first end of the element or the connection line and an element or a connection line connected to a second end of the element or the connection line.

With this configuration, the circuit logic model described above can be generated based on the element list described above, and the safety when a failure event occurs can be verified based on the circuit logic model described above.

According to a seventh aspect of the present invention, in the verification-processing device according to the sixth aspect, the logic generation unit generates the circuit logic model, based on a power supply definition table that stores data indicating a relationship between a connection point of a power supply line to which a control voltage of the relay is applied and a power supply related to the power supply line.

With such a configuration, it is possible to verify the safety when a failure event occurs, based on the circuit logic model generated from the above power supply definition table.

According to an eighth aspect of the present invention, a logic-generating device includes a logic generation unit that is configured to generate a circuit logic model represented by an evaluation expression based on data on a list showing a mutual connection relationship between the element and the connection line, the evaluation expression being represented by a logical expression taking, as variables, as a relay, an element, and a connection line that form a relay logic circuit of a verification target, the evaluation expression including at least the logical expression for a case where a failure event occurs in the relay logic circuit.

With such a configuration, a circuit logic model represented by an evaluation expression represented by a logical expression taking, as variables, a relay, an element, and a connection line that form a relay logic circuit of a verification target, the evaluation expression including at least the logical expression for a case where a failure event occurs in the relay logic circuit, is generated based on data on a list showing a mutual connection relationship between the element and the connection line, thereby it is possible to verify the safety when a failure event occurs in the relay logic circuit using the relay.

According to a ninth aspect of the present invention, a verification-processing method includes a step of acquiring a circuit logic model represented by an evaluation expression in which a relay logic circuit of a verification target is represented by a logical expression taking as variables, a relay, an element, and a connection line that form the relay logic circuit, the evaluation expression including at least the logical expression for a case where a failure event occurs in the relay logic circuit; and a step of determining a logical state of an output of the relay when a failure event occurs in the element or the connection line, based on the circuit logic model.

With such a configuration, in the relay logic circuit using the relay, it is possible to verify the safety when a failure event occurs.

Advantageous Effects of Invention

According to the above-described verification-processing device, logic-generating device, and verification-processing method, it is possible to verify the safety when a failure event occurs in a relay logic circuit using a relay.

BRIEF DESCRIPTION OF DRAWINGS

FIG. 5 is a diagram for explaining an example of a model inspection code in the present embodiment.

FIG. 8 is a diagram for explaining a power supply definition table showing a configuration of a power supply system of the relay logic circuit shown in FIG. 7.

FIG. 9 is a diagram showing an element list of the relay logic circuit shown in FIG. 7.

FIG. 11 is a diagram for explaining a process of extracting the same connection point according to the present embodiment.

FIG. 12 is a diagram for explaining an automatic creation process of connection point information in the present embodiment.

FIG. 13 is a diagram showing a logical expression in the present embodiment.

DESCRIPTION OF EMBODIMENTS

Next, a verification-processing device according to embodiments of the present invention will be described with reference to the drawings.

In the following description, electrically connecting may be simply referred to as "connecting". In addition, the source code in a computer program may simply be referred to as "code". The "model inspection code" to be described later is an example of the above "code".

The verification-processing device in the following embodiments inspects an event when an unsafe event occurs, using a predetermined inspection expression. For example, the above-described inspection expression defines an inspection that "when both the relay element A and the relay element B are ON, the element C that always generates an alarm signal is turned ON", as a logical operation expression. Temporal logic is a method of expressing such an inspection. "Linear temporal logic (LTL)" and "Computational Tree Logic (CTL)" are examples of temporal logic. The verification-processing device according to the embodiments is an example of a logic-generating device.

First Embodiment

Figure 1:
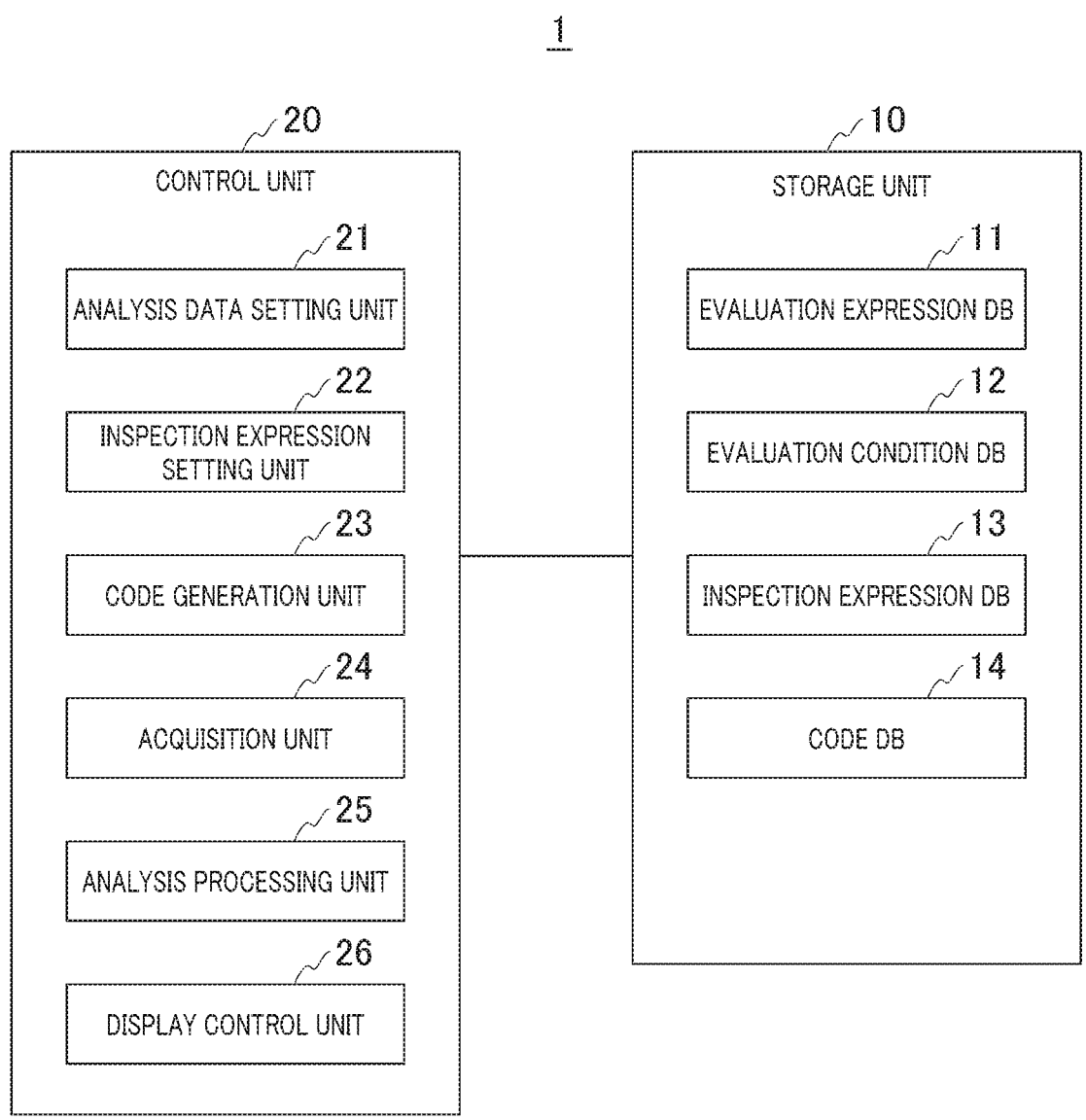
FIG. 1 is a configuration diagram showing a schematic configuration of a verification-processing device of a first embodiment.

FIG. 1 is a configuration diagram showing a schematic configuration of a verification-processing device of the present embodiment.

As illustrated in FIG. 1, the verification-processing device 1 according to the present embodiment includes a storage unit 10 and a control unit 20.

The storage unit 10 stores data regarding the evaluation expression DB 11, the evaluation condition DB 12, the inspection expression DB 13, and the code DB 14.

The evaluation expression DB 11 includes data regarding the evaluation expression for the relay logic circuit to be evaluated. The evaluation expression is formed as a logical expression in which the relay, the element, and the connection line forming the relay logic circuit to be verified are variables. This evaluation expression includes at least a logical expression when a failure event occurs in the relay logic circuit. For example, the logical expression is generated for each relay whose operation is to be analyzed.

The evaluation condition DB 12 includes data regarding the evaluation condition and the result of the analysis based on the evaluation condition when performing the analysis process using the evaluation expression stored in the evaluation expression DB 11. For example, the evaluation condition may include data that defines the type of analysis process.

For example, the types of analysis process include the following types. A first type is to analyze the basic operation of the relay logic circuit determined by the specifications. A second type is to analyze a case where a disconnection occurs in a path to be analyzed, as an example of the case where a failure event occurs in a relay logic circuit. A third type is to analyze a case where unintentional contact occurs in a path to be analyzed, as an example of the case where a failure event occurs in a relay logic circuit.

As an analysis request specification in the verification-processing device 1, execution of the analysis process is defined in the evaluation condition DB 12, so that it can be defined that the individual types of analyzes described above are to be performed independently or in combination.

The inspection expression DB 13 includes data regarding inspection expression corresponding to inspection items regarding the relay logic circuit to be evaluated.

The code DB 14 includes a code for an evaluation process (model inspection code) generated based on the data regarding the evaluation expression stored in the evaluation expression DB 11. The model inspection code stores data such as preconditions required for executing the evaluation expression, in addition to the above-described evaluation expression, and a circuit logic model is formed by combining them. An example of the specific model inspection code will be described later.

The control unit 20 includes an analysis data setting unit 21, an inspection expression setting unit 22, a code generation unit 23, an acquisition unit 24, an analysis processing unit 25 (determination unit), and a display control unit 26.

The analysis data setting unit 21 acquires analysis data for verification process from the outside, by a user's operation or by communication. For example, the analysis data setting unit 21 acquires data including the evaluation expression created by the user and stores it in the evaluation expression DB 11.

The inspection expression setting unit 22 acquires data regarding inspection conditions for verification process from the outside, by a user's operation or by communication. For example, the inspection expression setting unit 22 sets an inspection expression expressing an unsafe event occurring in the relay logic circuit and stores it in the inspection expression DB 13.

The code generation unit 23 acquires an evaluation expression including a logical expression when a failure event occurs in the relay logic circuit from the evaluation expression DB 11 and generates a code (evaluation expression code) corresponding to the evaluation expression. The code generation unit 23 acquires an inspection expression for inspecting an event when a failure event occurs in the relay logic circuit from the inspection expression DB 13, and generates a code (inspection expression code) corresponding to the inspection expression. The code generation unit 23 combines the evaluation expression code and the inspection expression code and adds the model inspection code corresponding to the above evaluation expression to the code DB 14.

The acquisition unit 24 acquires the model inspection code corresponding to the evaluation expression, from the code DB 14. The model inspection code corresponding to the evaluation expression is an example of a circuit logic model.

The analysis processing unit 25 performs a logic analysis process based on the circuit logic model acquired by the acquisition unit 24. The analysis process uses a model inspection method.

More specifically, the analysis processing unit 25 acquires data relating to the evaluation condition from the evaluation condition DB 12 and performs an inspection (analysis) according to the evaluation condition. For example, the inspection process includes a process of performing an analysis process of a type defined by the evaluation condition and a determination process of comparing the result of the analysis process with an expected value. The analysis processing unit 25 performs the analysis process for each inspection item according to the inspection item defined in the evaluation condition, and stores the result of determining the result of the analysis process by using a predetermined inspection expression in association with the inspection items in the evaluation condition DB 12.

The display control unit 26 generates data on a display screen for processing and visualizing various types of data stored in the storage unit 10. The display screen generated by the display control unit 26 includes a screen including an evaluation expression that defines the circuit logic model, a screen including a result of the determination based on the result of the analysis process, or the like.

The verification-processing device 1 formed as described above may analyze the state in which the state of the relay logic circuit and the failure event are combined, by, for example, including a failure event in the relay logic circuit in the condition for verifying the operation thereof. In the above case, it is possible to analyze a sequential circuit type relay logic circuit.

The inspection items defined in the evaluation condition DB 12 may be comprehensively defined such that there is no omission in the inspection items in the analysis process. As a method of comprehensively defining the items, there is a method of automatically generating variables such that the values of the variables in the evaluation expression used for the analysis process become a combination of variables different from one another for each inspection item. By comprehensively defining inspection items by the above method, it is possible to verify that no unsafe event occurs in the output of the relay in the relay logic circuit for any event that occurs regardless of the state.

Figure 2:
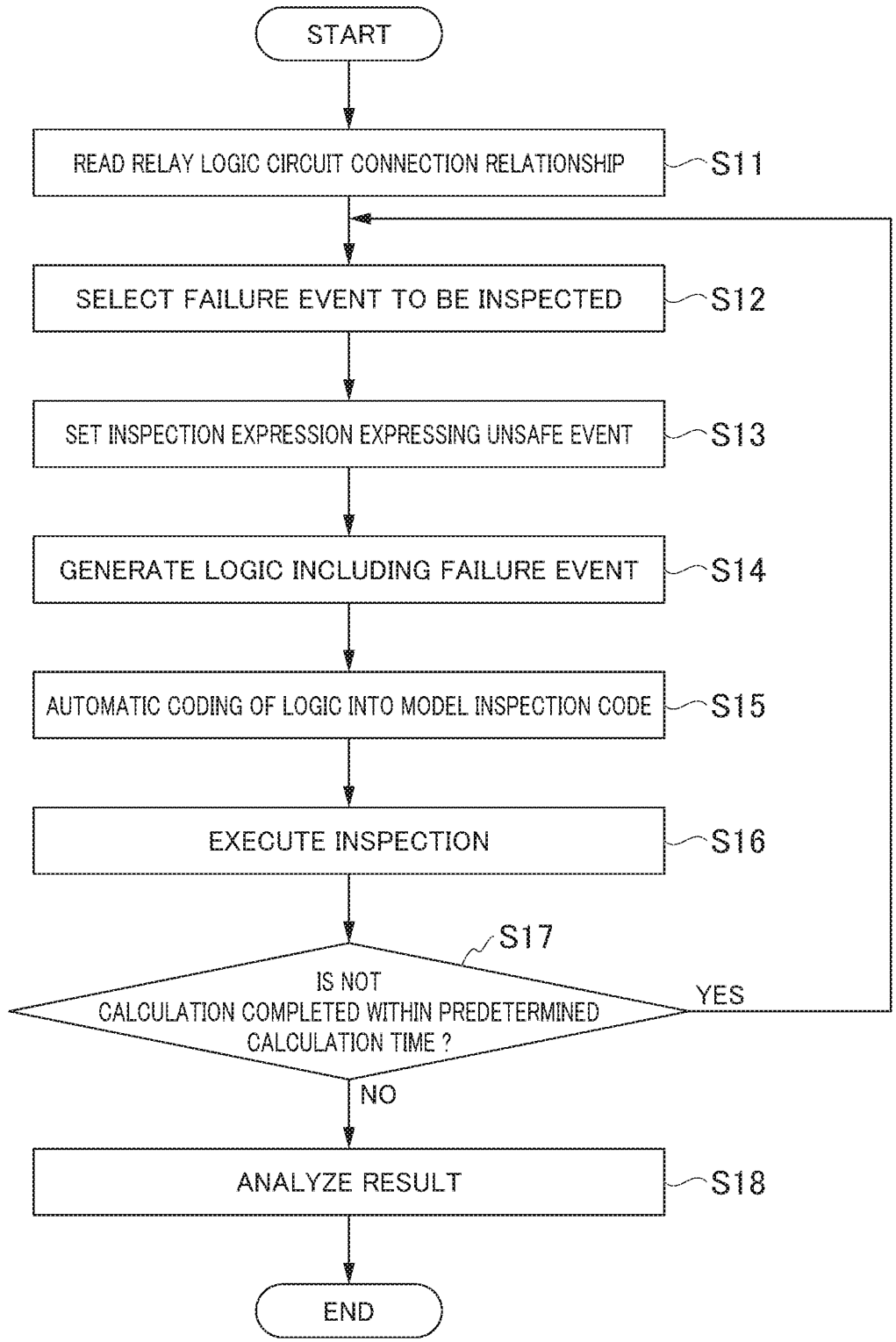
FIG. 2 is a flowchart showing a procedure of a verification process according to an embodiment of the present invention.

FIG. 2 is a flowchart showing the procedure of the verification process in the present embodiment. First, the outline of the verification process will be described. In the present embodiment, some processes are performed by the user.

First, the user reads the connection relationship of each element in the relay logic circuit (step S11) and arranges the connection relationship of each element.

Next, the analysis data setting unit 21 sequentially selects, from a plurality of types of failure events, the types of failure events subjected to inspection (failure events to be inspected) according to a predetermined rule (step S12). For example, the display control unit 26 causes the display unit (not shown) to display a plurality of types of analysis processes that are associated with the types of failure events subjected to inspection. The user selects one or a plurality of types from the displayed plurality of types of analysis processes and registers the selection result in the verification-processing device 1. The analysis data setting unit 21 stores the verification condition corresponding to the selection result in the evaluation condition DB 12.

Next, the user generates data regarding an inspection expression for inspecting an event when a failure event occurs in the relay logic circuit and registers the data in the verification-processing device 1. In response to this, the inspection expression setting unit 22 sets an inspection expression expressing an unsafe event occurring in the relay logic circuit (step S13) and stores it in the inspection expression DB 13.

Next, the user generates data indicating a logic circuit (logic) including a failure event, based on the connection relationship of each element (step S14) and registers it in the verification-processing device 1. In response to this, the analysis data setting unit 21 stores the data of the evaluation expression generated by the user in the evaluation expression DB 11 of the storage unit 10.

Next, the code generation unit 23 generates a model inspection code, based on the evaluation expression data stored in the evaluation expression DB 11 and the inspection expression data stored in the inspection expression DB 13 (step S15). Generating the model inspection code is indicated as "auto coding" in FIG. 2. The model inspection code includes an evaluation expression corresponding to a logic circuit to be verified and is converted into a program code that can be executed by the computer. FIG. 5, which will be described later, shows an example of the model inspection code.

Next, the acquisition unit 24 acquires the model inspection code from the code DB 14. The model inspection code is the evaluation expression including the logical expression when the failure event occurs in the relay logic circuit 2, and represents the circuit logic model. The analysis processing unit 25 executes the inspection, based on the generated model inspection code (step S16).

Next, the analysis processing unit 25 determines that the calculation is not completed within the predetermined calculation time (step S17). When the calculation is not completed within the predetermined calculation time, the processes from step S12 are repeated. At that time, the type of the failure event subjected to inspection may be switched.

When the calculation is completed within the predetermined calculation time, the display control unit 26 causes the display unit to display the result such that the user can interpret so as to whether the result of the determination is good (step S18). The verification-processing device 1 completes the series of processes shown in the drawing after performing each process according to the above procedure.

Next, the details of the process in each step of the procedure of the above verification process will be described in order.

Figures 3, 4:
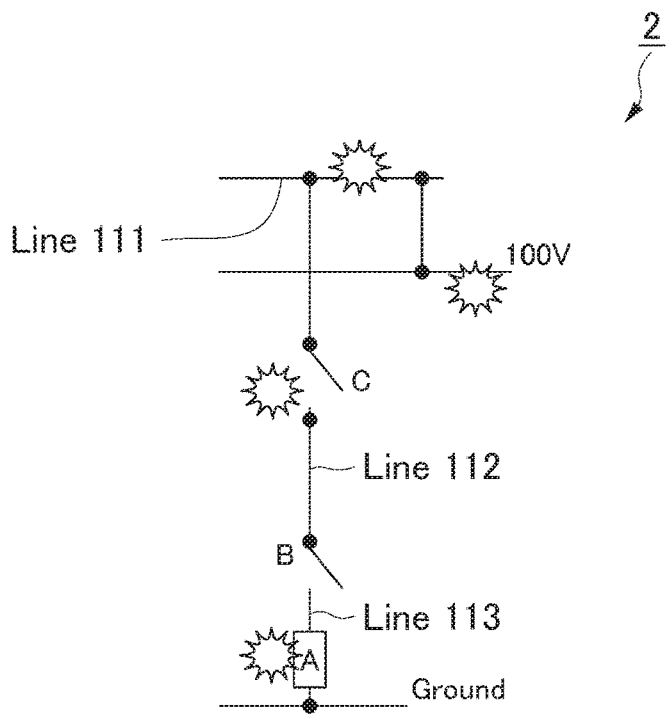
FIG. 3 is a diagram for explaining the verification process in the present embodiment.
FIG. 4 is a diagram showing an example of a circuit logic corresponding to the connection form shown in FIG. 3.

FIG. 3 is a diagram for explaining the verification process in the present embodiment. FIG. 3 shows a connection diagram of the relay logic circuit 2 as an example. The relay logic circuit 2 shown in FIG. 3 includes a relay A, a switch B, a switch C, and a power supply unit P. The relay A includes a coil and a contact (not shown). The coil of the relay A, the switch B, and the switch C are connected in series in the order described, a first end (the end on the switch C side) of the series-connected circuit is connected to the power supply unit P, and a second end (the end on the relay A side) is connected to the ground electrode (Ground).

To describe the above connection in more detail, the output terminal of the power supply unit P is connected to one end of the connection line Line111. The first end of the switch C is connected to the connection line Line111. One end of a connection line Line112 is connected to the second end of the switch C. The first end of the switch B is connected to the other end of the connection line Line112. A connection line Line113 is connected to the second end of the switch B. The first end of the coil of the relay A is connected to the connection line Line113. The ground electrode is connected to the second end of the coil of the relay A.

A unique failure event depending on the type of each part may occur in each of the parts forming the relay logic circuit 2. The following are assumed as the failure event.

Examples of objects in which a failure event may occur are a manual-operated switch, a relay element, a power supply unit, a connection line, and a diode. The following are assumed as the failure events that can occur in each of the above objects.

There is a risk of erroneous operation in operating the manual-operated switch. The conductive state of the manual-operated switch can be either an ON state or an OFF state.

The relay element includes one having a mechanical contact and one having a semiconductor element instead of the mechanical contact. Here, the case of a relay element having a mechanical contact is illustrated. In the relay element having a mechanical contact, there is a risk of welding the contact of the relay, and contact and unintentional contact with the coil side of the relay. Therefore, a case where the conductive state (referred to as the output state) of the contact of the relay follows the logical state (referred to as the logic) corresponding to the control voltage applied to the coil of the relay and a case where the ON state or the OFF state can be taken without following the logical state are assumed. The above logic is the expected value of the output state of the contact of a relay.

In the power supply unit, there is a risk of unintentional contact with different potentials on the output side and disconnection of the connection line electrically connected to the output terminal of the power supply unit. Therefore, it is assumed that the state of the power supply unit can be either a state in which a predetermined voltage such as a rated voltage can be output (ON state) or a state in which the predetermined voltage cannot be output (OFF state). The state in which a predetermined voltage can be output (ON state) includes a state in which a predetermined current can be output, and the state in which a predetermined voltage cannot be output (OFF state) includes a state in which a predetermined current cannot be output.

There is a risk of unintentional contact and disconnection in the connection line. Therefore, in the embodiment, a virtual element having a logical state is assigned to each connection line.

Although not shown in FIG. 3, a rectifying element such as a diode (hereinafter collectively referred to as a diode) may be backflowed due to welding (element damage).

FIG. 4 is a diagram showing an example of a logical expression (circuit logic) corresponding to the connection form shown in FIG. 3.

FIG. 4(*a*) shows a logical expression that defines the normal operation. The logical expression shown in FIG. 4(*a*) includes A, B, C, and (Power_100V) as variables. The logical expression is described as Expression (1).

$$A=B \text{ and } C \text{ and } \text{Power\_100V} \tag{1}$$

The types of the variables A, B, C, and (Power_100V) in Expression (1) are logical types. For example, the variables A, B, C, and (Power_100V) are associated with the relay A, the switch B, the switch C, and the power supply unit P, respectively.

In the above logical expression, the variable A indicates the output state of the relay to be verified. The variables B and C indicate the states of the elements on the path to be verified. As for the value, the conductive state (ON state) is indicated by the true value of positive logic. For example, each variable takes a binary value of "0" (false value) or "1" (true value). For example, the value of the variable is set to "1" when the switch B, the switch C, or the like having a contact is in the conductive state (ON state).

In the above logical expression, the variable (Power_100V) indicates the output state of the power supply unit P. As for the value, the output state (ON state) is indicated by the true value of positive logic. For example, the value of the variable in the output state (ON state) is set to "1".

In addition, "and" that connects variables in Expression (1) is an operator indicating an AND operation. When the operation of this operation expression is performed, the result of the operation on the right side of Expression (1) is assigned to the variable on the left side.

The logical expression that defines the basic operation shown in Expression (1) includes a logical expression that indicates an AND operation of variables that indicate elements on the path to be verified. The basic operation is an operation when a failure event such as disconnection or unintentional contact does not occur.

When the above Expression (1) is associated with the circuit of FIG. 3, the switch B conducts, the switch C conducts, and the control power (Power_100V) is supplied to the switch C from the power supply unit P1, a control voltage is applied to the coil of the relay A. The above Expression (1) models that the contact of the relay A is closed and the relay A conducts in the above situation. It should be noted that when the situation is other than the above, it indicates that the contact of the relay A is opened and does not conduct.

FIGS. 4(*b*) and 4(*c*) show logical expressions (circuit logic) assuming a failure event in the circuit of FIG. 3. The logical expression shown below includes at least an element indicating an operation when a failure event occurs in the relay logic circuit 2.

The logical expression shown in FIG. 4(*b*) that assumes a failure event is based on the assumption of unintentional contact.

When unintentional contact occurs at each connection point (connection line) in the circuit, even in the situation where the current should not flow through the coil of the relay A, an event is assumed in which a potential is generated due to unintentional contact of the connection line or the like and thus a current flows through the coil of the relay A.

In the example shown in FIG. 3 described above, there are three connection lines Line111, Line112, and Line113. Assuming that unintentional contact occurs on these connection lines, the following three types of events can occur. The three types of events are the unintentional contact of the connection line Line113, the unintentional contact of the connection line Line112, and the unintentional contact of the connection line Line111. These events are modeled, and represented by the following logical expression.

For example, in a case where there is unintentional contact by the connection line Line113, a current may flow in the coil of the relay A and the relay A may operate. In such a case, the relay A operates regardless of the state of the switch B or the like. This is shown in the following Expression (2).

$$A=\text{Line}113 \tag{2}$$

Further, in a case where there is unintentional contact by the connection line Line 112, when the switch B is in the ON state, a current may flow in the coil of the relay A and the relay A may operate. In such a case, the relay A operates regardless of the state of the switch C or the like. This is shown in the following Expression (3).

$$A=B \text{ and } \text{Line}112 \tag{3}$$

Further, in a case where there is unintentional contact by the connection line Line 111 is touched, when both the switch B and the switch C are in the ON state, a current may flow in the coil of the relay A and the relay A may operate. This is shown in the following Expression (4).

$$A=B \text{ and } C \text{ and } \text{Line}111 \tag{4}$$

In addition to the above Expressions (2) to (4), a current flows through the coil of the relay A when the condition based on the basic function shown in the Expression (1) is satisfied. That is, the relay A operates when any one condition of Expression (1) to Expression (4) is satisfied. This relationship is shown in Expression (5). Expression (5) is an expression for calculating the logical sum of the operation results from Expressions (2) to (4).

$$A=\text{Line}113 \text{ or } (B \text{ and } \text{Line}112) \text{ or } (B \text{ and } C \text{ and } \text{Line}111) \text{ or } (B \text{ and } C \text{ and } \text{Power\_100V}) \tag{5}$$

In the above logical expressions, variables A, B, and C indicate the states of the relay to be verified and the elements on the path as described above. In the above logical expression, the variable (Power_100V) indicates the output state of the power supply unit P as described above.

In the above logical expressions, the variables Line113, Line112, and Line111 indicate the states of the connection lines on the path to be verified, and the unintentional contact state (ON state) is indicated by the true value of positive logic. For example, each variable takes a binary value of "0" (false value) or "1" (true value). For example, when unintentional contact occurs in a connection line, the value of the variable of the connection line is set to "1". When unintentional contact does not occur in a connection line, the value of the variable of the connection line is set to "0".

In the above logical expression, Expression (1) is an example of a first expression including an AND operation of a variable indicating an element on a path provided with a relay and a variable indicating a connection line. Further, Expressions (2) to (4) are an example of a second expression that uses elements and connection lines of a path provided with a relay as analysis targets, the elements being at a point where a short circuit (unintentional contact) may occur on the path or the elements being on a path between connection lines and the relay, and that includes an AND operation of variables indicating the elements which are the analysis targets and variables indicating the connection lines which are the analysis targets.

Further, "or" that connects the respective terms in Expression (5) is an operator indicating an OR operation. In the case of Expression (5) as well, as in the case of the above-described Expression (1), when the operation of the operation expression is performed, the result of the operation on the right side of Expression (5) is assigned to the variable on the left side.

FIG. 4(c) shows a circuit logic assuming unintentional contact and disconnection as failure events.

When either unintentional contact or disconnection occurs at each connection point (connection line) in the circuit, even in the situation where the current should not flow through the coil of the relay A, it is assumed that a current flows through the coil of the relay A due to the occurrence of unintentional contact of the connection line or the like. Even in the situation where the current should flow through the coil of the relay A, it is assumed that a current does not flow through the coil of the relay A due to the occurrence of disconnection of the connection line or the like.

In the example shown in FIG. 3 described above, there are three connection lines Line111, Line112, and Line113. It is assumed that either unintentional contact or disconnection occurs in these connection lines. The unintentional contact is as described above. Here, the disconnection will be described. When a disconnection occurs in the connection lines, the following three types of events can occur. The three types of events are the disconnection of the connection line Line113, the disconnection of the connection line Line112, and the disconnection of the connection line Line111. These events are modeled, and represented by the following logical expression.

For example, if the connection line Line113 is not disconnected due to unintentional contact of the connection line Line113, a current may flow in the coil of the relay A and the relay A may operate. In such a case, the relay A operates regardless of the state of the switch B or the like. This is shown in the following Expression (6).

$$A=(\text{Line113 and }DC\_\text{Line113}) \qquad (6)$$

In the above Expression (6), the variable DC_Line113 is a variable indicating whether or not the connection line Line113 is disconnected. Similarly, the variable "DC_Linexxx" is a variable indicating whether or not the connection line Linexxx is disconnected. For example, the DC_Line 113 indicates "1" as a true value (TRUE) of positive logic when the disconnection does not occur in the connection line and indicates "0" as a false value of positive logic when the disconnection occurs.

Further, when the connection line Line112 is not disconnected and the switch B is in the ON state, due to unintentional contact of the connection line Line112, a current may flow in the coil of the relay A and the relay A may operate. In such a case, the relay A operates regardless of the state of the switch C or the like. This is shown in the following Expression (7).

$$A=B \text{ and }(\text{Line112 and }DC\_\text{Line112}) \qquad (7)$$

Further, when the connection line Line111 is not disconnected and both the switch B and the switch C are in the ON state, due to unintentional contact of the connection line Line111, a current may flow in the coil of the relay A and the relay A may operate. This is shown in the following Expression (4).

$$A=B \text{ and }C \text{ and }(\text{Line111 and }DC\_\text{Line111}) \qquad (8)$$

In addition to the above Expressions (6) to (8), a current flows through the coil of the relay A when the basic operation condition shown in Expression (1) is satisfied. The relay A operates when any one condition of Expression (1) and Expression (6) to Expression (8) is satisfied. This relationship is shown in Expression (9). Expression (9) is for calculating the logical sum of the operation results from Expression (1), and Expressions (6) to (8).

$$\begin{aligned}A=&(\text{Line113 and }DC\_\text{Line113}) \text{ or }B \text{ and }(\text{Line112}\\&\text{ and }DC\_\text{Line112}) \text{ or }B \text{ and }C \text{ and }(\text{Line111 and }\\&DC\_\text{Line111}) \text{ or }(B \text{ and }C \text{ and Power\_100V}) \qquad (9)\end{aligned}$$

In the above logical expression, the variables A, B, C, the variable (Power_100V), the variables Line113, Line112, and Line111 are as described above. In the above logical expressions, the variables DC_Line113, DC_Line112, and DC_Line111 indicate the conductive state of the connection line on the path to be verified, and the conductive state (ON state) is indicated by the true value of positive logic. For example, each variable takes a binary value of "0" (false value) or "1" (true value), as in the case of the element. For example, when the connection line Line113 is in the conductive state (ON state), the value of the variable of the connection line is set to "1". When the connection line Line113 is in the disconnection state (OFF state), the value of the variable of the connection line is set to "0".

As described above, three types of verification cases including: the case where no failure event has occurred, the case where unintentional contact (failure event) has occurred, and the case where a failure event such as unintentional contact or disconnection has occurred have been described. For each of the above verifications, as in the process of step S12 in FIG. 2 described above, "sequentially selecting, from a plurality of types of failure events, the types of failure events subjected to inspection (failure events to be inspected) according to a predetermined rule" may be performed.

Next, a specific example of the model for circuit verification used in the above verification process will be described.

FIG. 5 is a diagram for explaining an example of a model inspection code in the present embodiment.

The model inspection code shown in FIG. 5 is for performing the process of logic verification. Depending on the content indicated by the model inspection code, it can be divided into a plurality of blocks as described below.

In the example shown in FIG. 5, code that provides the following arithmetic process is shown. This code is based on the inspection method of the SMV method.

First block (first row): a declaration statement of a main module (main).

Second block: a variable declaration part for defining the type of each variable. For example, the variable types of the variables Switch_B and Switch_C are defined as logical types (Boolean). The variable Switch_B is defined such that when the switch B is erroneously operated, a logic "1" indicating the occurrence of a failure event is set. The variable Switch_C is defined such that when the switch C is erroneously operated, a logic "1" indicating the occurrence of a failure event is set.

Third block: a variable definition unit for defining the value of each variable. In the example shown in FIG. 5, the value of the variable Line111 is fixed to "1" as an initial value. For example, the logic "1" is indicated by "TRUE". Although not shown, the logic "0" is indicated by "False".

Fourth block: a logical operation unit that defines the arithmetic process of this module, and is a place for updating the state of the element. The arithmetic process shown below is described in an assignment statement. The expression on the first row of the fourth block sets the initial value of the variable Relay_C to "False". In the expression on the second row, a value according to the following condition is assigned to the variable Relay_C. This expression indicates that the variable Relay_C is set to logic "1", when the variable Switch_B, the variable Switch_C, and the variable Line111 are all logic "1" and the variable Power_100V is logic "1".

Fifth block: an inspection expression unit that sets an inspection expression for determining the result of the above arithmetic process. This example is described in CTL. The expression on the second row of the fifth block is such that "when the variable ProcessX becomes TRUE (true value or "1"), "Relay_C is FALSE" does not occur." is defined as a required specification. For example, when applying to more specific cases, "in a situation where an emergency signal should be emitted (ProcessX=TRUE), "no emergency signal is emitted (Relay_C=FALSE)" does not occur." can be defined as a required specification.

According to the above-described embodiment, for example, the circuit logic model is expressed by the model inspection code, and the inspection expression for the model is described in CTL. Thus, by using the circuit logic model instead of the relay logic circuit using a relay, the determination unit can verify the failure event that occurs in the element or the connection line in the relay logic circuit, and it is possible to verify the safety when a failure event occurs in the above relay logic circuit.

The above-described circuit logic model is indicated by an evaluation expression represented by a logical expression taking, as variables, variables corresponding to a relay, an element, and a connection line that form a relay logic circuit to be verified, the evaluation expression including at least a logical expression for a case where a failure event occurs in the relay logic circuit, so that it is possible to analyze the possibility of falling into an unsafe state when a failure event occurs. The unsafe state is a state in which the output of the relay logic circuit to be verified is different from the safe state. For example, the unsafe state is a state in which it is desired that the output does not occur while the relay logic circuit to be verified is operating.

Second Embodiment

Subsequently, a second embodiment will be described with reference to drawings of FIG. 2 and FIGS. 6 to 15.

Although the logic verification code as the model for logic verification is generated by the user in the first embodiment, the logic verification code of the present embodiment is generated by the verification-processing device.

Figure 6:
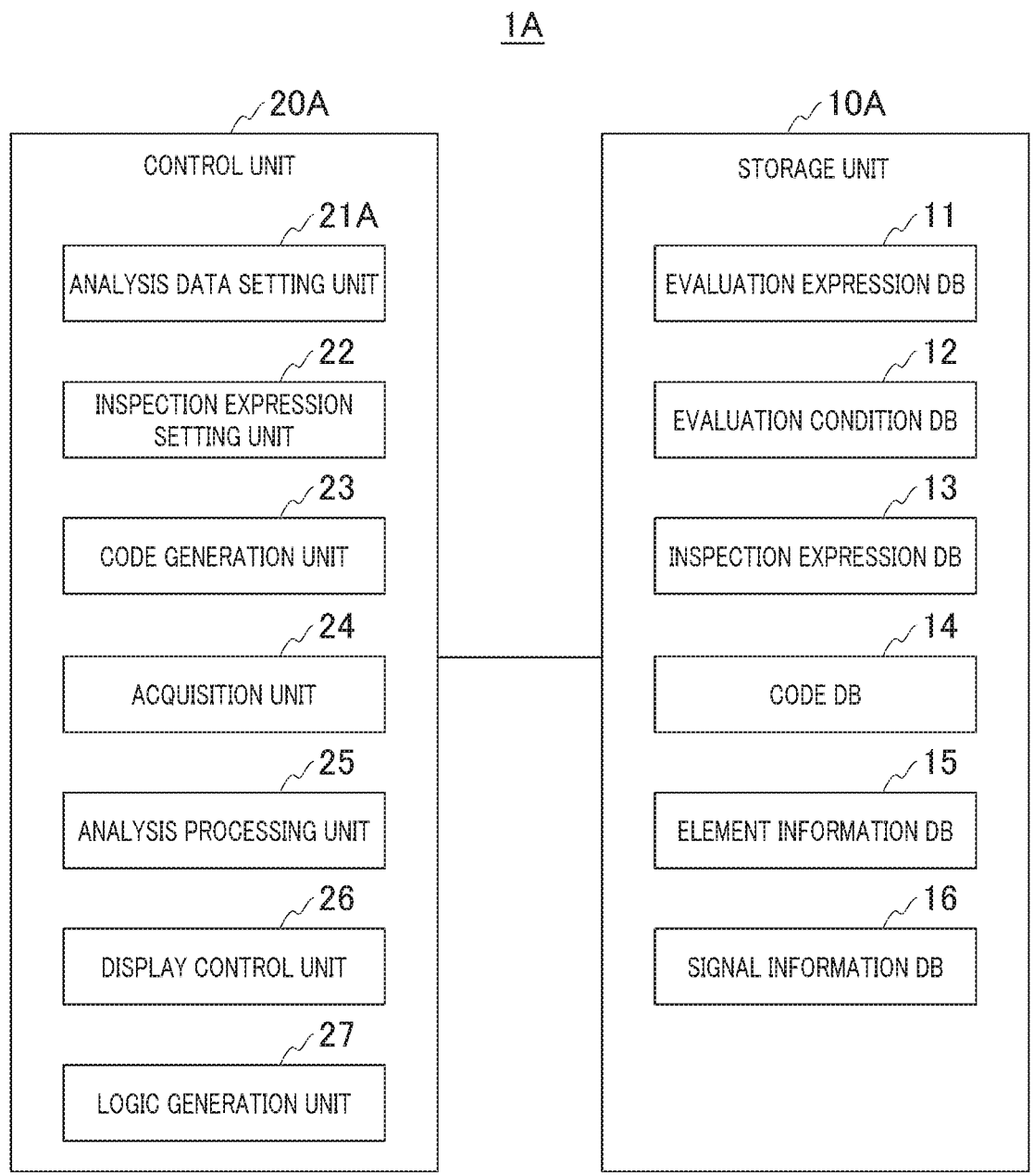
FIG. 6 is a configuration diagram showing a schematic configuration of a verification-processing device of a second embodiment.

FIG. 6 is a configuration diagram showing a schematic configuration of a verification-processing device of the present embodiment.

As illustrated in FIG. 6, the verification-processing device 1A according to the present embodiment includes a storage unit 10A and a control unit 20A.

The storage unit 10A includes an evaluation expression DB 11, an evaluation condition DB 12, an inspection expression DB 13, a code DB 14, an element information DB 15, and a signal information DB 16.

The element information DB 15 (Dev table) includes data of configuration information regarding the elements included in the relay logic circuit subject to the verification process and the connection information indicating the connection relationship of the elements. Details of the element information DB 15 will be described later.

The signal information DB 16 (Sig table) includes data regarding the power supply system that supplies power to the relay logic circuit subject to the verification process. The power supply definition table described later is an example of data regarding the above power supply system. Details of the signal information DB 16 will be described later.

The control unit 20A includes an analysis data setting unit 21A, a code generation unit 23, an acquisition unit 24, an analysis processing unit 25, a display control unit 26, and a logic generation unit 27.

The analysis data setting unit 21A acquires analysis data for verification process from the outside, by a user's operation or by communication. For example, the analysis data setting unit 21A acquires data created by the user and stores it in the element information DB 15 and the signal information DB 16. The data created by the user includes elements included in the relay logic circuit subject to the verification process, a list of connection information indicating the connection relationship of the elements, a list of data on a power supply system for supplying power to the relay logic circuit subject to the verification process, or the like.

The logic generation unit 27 generates the circuit logic model represented by the evaluation expression, based on the data of the list showing the connection relationship between the elements and the connection lines. As described above, the above evaluation expression is represented by a logical expression taking as variables, a relay, an element, and a connection line that form a relay logic circuit to be verified, and includes at least the logical expression for a case where a failure event occurs in the relay logic circuit.

The code generation unit 23 converts the logic (evaluation expression) generated by the logic generation unit 27 into a code. Although the code generation unit 23 and the logic generation unit 27 are described separately in the embodiment, they may be integrally formed without being divided.

Next, the outline of the verification process of the present embodiment will be described with reference to FIG. 2 described above.

First, the user reads the connection relationship of each element in the relay logic circuit (step S11) and registers the data indicating the connection relationship of each element in the verification-processing device 1. In response to this, the analysis data setting unit 21 registers the data, which is generated by the user, indicating the connection relationship of each element in the element information DB 15. For example, the analysis data setting unit 21A acquires the configuration information of the relay logic circuit for the verification process from the external device or the like by a user operation or by communication. For example, the configuration information includes an element extracted from the relay logic circuit and data indicating the connection relationship of the element in the element list. In this case, the analysis data setting unit 21A acquires data regarding the element list and adds the acquired element list to the element information DB 15. Further, the analysis data setting unit 21A similarly acquires data regarding the power supply system that supplies power to the relay of the relay logic circuit and adds the acquired data to the signal information DB 16.

Next, the analysis data setting unit 21 sequentially selects, from a plurality of types of failure events, the types of failure events subjected to inspection (failure events to be inspected) according to a predetermined rule (step S12). For example, the display control unit 26 causes the display unit (not shown) to display a plurality of types of analysis processes that are associated with the types of failure events subjected to inspection. The user selects a specific type from the displayed plurality of types of analysis processes, and registers the selection result in the verification-processing device 1. The analysis data setting unit 21 stores the selection result in the evaluation condition DB 12.

Next, the user generates data regarding an inspection expression for inspecting an event when a failure event occurs in the relay logic circuit, and registers the data in the verification-processing device 1. In response to this, the inspection expression setting unit 22 sets an inspection expression expressing an unsafe event occurring in the relay logic circuit (step S13) and stores it in the inspection expression DB 13.

Next, the logic generation unit 27 generates a logical expression (logic) including a failure event, based on the data in the element information DB 15 and the data in the signal information DB 16 (step S14). Generation of data indicating a logic circuit (logic) will be described later.

Next, the code generation unit 23 generates a model inspection code, based on the evaluation expression data stored in the evaluation expression DB 11 and the inspection expression data stored in the inspection expression DB 13 (step S15).

Next, the analysis processing unit 25 executes the inspection, based on the model inspection code generated by the code generation unit 23 (step S16). For the process after step S17, the description about the above-described first embodiment will be referred to.

Figure 7:
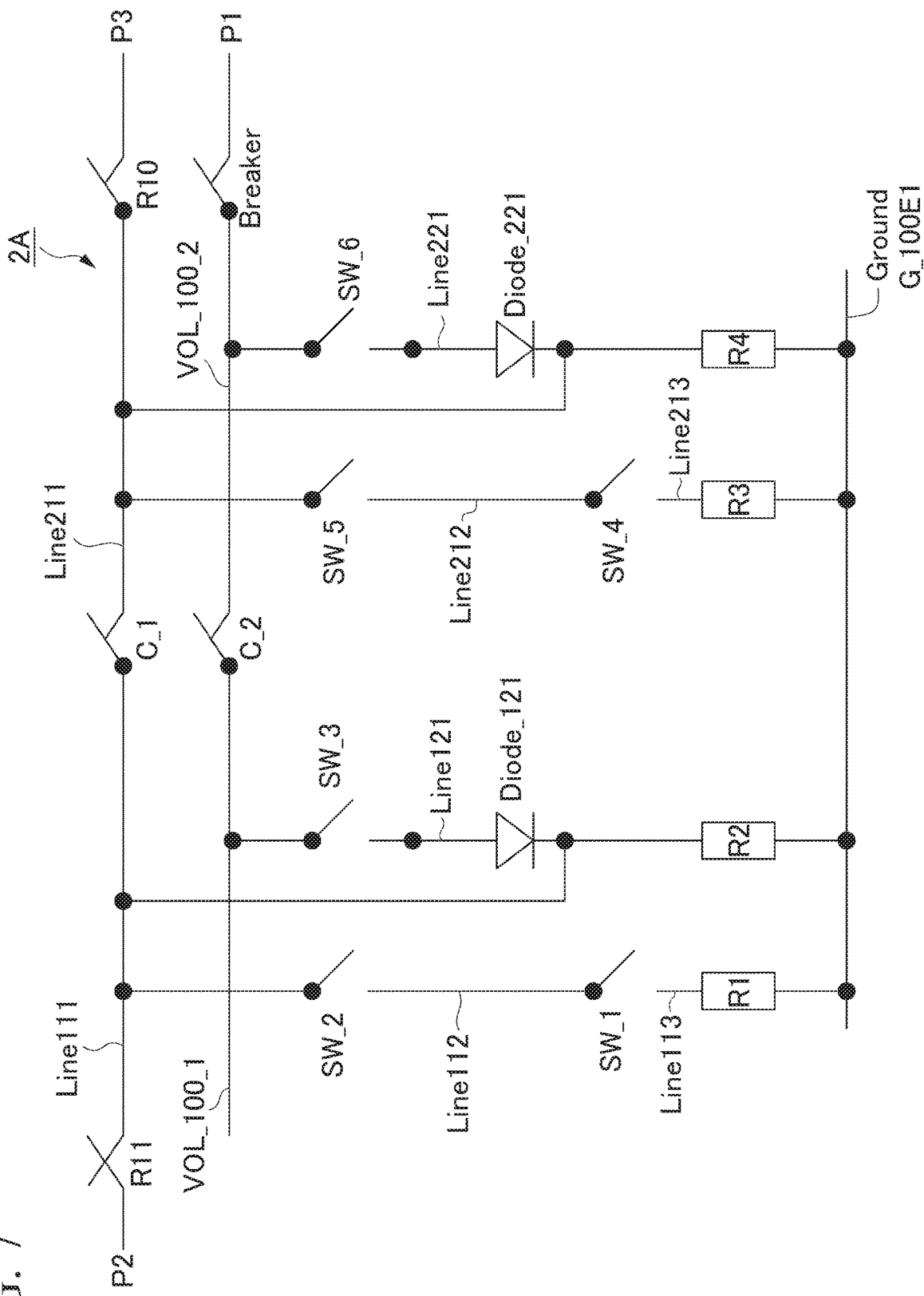
FIG. 7 is a diagram showing an example of a more complicated relay logic circuit in the present embodiment.

FIG. 7 is a diagram showing an example of a more complicated relay logic circuit in the present embodiment.

The relay logic circuit 2A shown in FIG. 7 includes relays R1, R2, R3, and R4, diodes Diode_121 and Diode_221, switches SW_1, SW_2, SW_3, SW_4, SW_5, and SW_6, and circuit breakers Breaker, C_1, C_2, R11, and R12, and power supply units P1, P2 and P3.

The relays R1, R2, R3, and R4 correspond to the relay A described above.

The diodes Diode_121 and Diode_121 are semiconductors having a rectifying function.

The switches SW_1, SW_2, SW_3, SW_4, SW_5, and SW_6 correspond to the above-described switches B and C, or the like, and are a-contact type.

The circuit breakers Breaker, R11 and R12 are so-called circuit breakers, and are b-contact type. Note that R11 and R12 may be contacts of a relay.

The contactors C_1 and C_2 electrically connect the connection lines, and are of the b-contact type.

First, the power supply system will be described. FIG. 8 is a diagram for explaining a power supply definition table showing a configuration of a power supply system of the relay logic circuit shown in FIG. 7. The power supply definition table (Sig table) shown in FIG. 8 includes items such as a power supply unit, a breaker, a connector part, and a connection point. This power supply definition table shows the connection information of the power supply system. For example, the power supply definition table stores data indicating the relationship between the connection point of the power supply line to which the control voltage of the relay is applied and the power supply related to the power supply line.

For example, the item of the power supply unit in the power supply definition table includes data regarding the identification information of the corresponding power supply device, the item of the breaker includes data regarding the identification information for identifying the circuit breaker (breaker) provided, the item of the connector part includes data regarding the connection destination connected to the circuit breaker, and the item of the connection point includes data regarding the wiring (connection line) connecting the circuit breaker and the connection destination.

The power supply unit P1 and the power supply units P2 and P3 described in the item of the power supply unit in the power supply definition table are power supplies that output a predetermined control voltage and function as, for example, a constant voltage source. For example, the output voltage of the power supply unit P1 is 100 volts. The output voltage of each of the power supply units P2 and P3 is 4 volts. The power supply units P2 and P3 are power supplies of different systems, for example. The power supply unit P1 and the power supply units P2 and P3 are configured such that the operation of each power supply unit is not affected even if their outputs are short-circuited.

The first terminal of the circuit breaker Breaker is connected to the subsequent stage of the power supply unit P1, and the first end of the connection line VOL_100_2 is connected to the second terminal (connection point) of the circuit breaker Breaker. The first terminal of the contactor C_2 is connected to the second end (connector part) of the connection line VOL_100_2. The connection line VOL_100_1 is connected to the second terminal of the contactor C_2. The first terminal of the circuit breaker R11 is connected to the subsequent stage of the power supply unit P1, and the first end of the connection line Line111 (denoted as (111) in FIG. 8) is connected to the second terminal (connection point) of the circuit breaker R11. The first terminal of the circuit breaker R10 is connected to the subsequent stage of the power supply unit P2, and the first end of the connection line Line211 (denoted as (211) in FIG. 8) is connected to the second terminal (connection point) of the circuit breaker R10.

The connection lines with "VOL_" in their names are connection lines to which a high potential is supplied in this relay logic circuit, and it is shown that the connection lines with "VOL_" in their names do not change to a high potential due to unintentional contact, even if the connection lines are in electrical contact with other connection lines.

For example, the coil of the relay R1, the switch B, and the switch C are connected in series in the order described, a first end of the series-connected circuit is connected to the power supply unit P, and a second end is connected to the ground electrode (Ground).

First, the breaker and the power supply unit are connected by a AND operator (&) for each connection point.

Next, for the connection point not described in the power supply unit, the power supply unit, the breaker, and the connector part described in the row of connection point having the same connector are connected by the AND operator (&).

For example, through the above-described process performed by the logic generation unit 27, for the variable of the following connection point, a logical expression for determining the value of the variable is generated. This expression is shown in Expressions (10) to (13).

$$\text{VOL\_100\_1} = !C\_2 \ \& \ \text{Breaker} \ \& \ 100 \ \text{VDC} \quad (10)$$

$$\text{VOL\_100\_2} = \text{Breaker} \ \& \ 100\text{V} \quad (11)$$

$$111\_\text{temp} = R11 \ \& \ 4V\_1 \quad (12)$$

$$211\_\text{temp} = R10 \ \& \ 4V\_2 \quad (13)$$

The value of VOL_100_1, which is the variable at the first connection point, is the result of the AND operation of the variables corresponding to the contactor C_2, the circuit breaker Breaker, and the power supply unit P1 (denoted as 100 VDC).

The value of VOL_100_2, which is the variable at the second connection point, is the result of the AND operation of the variables corresponding to the circuit breaker Breaker and the power supply unit P4 (denoted as 100V).

The value of LINE111, which is the variable at the third connection point, is the result of the AND operation of the variables corresponding to the circuit breaker R11 and the power supply unit P2 (denoted as 4V_1).

The value of LINE211, which is the variable at the fourth connection point, is the result of the AND operation of the variables corresponding to the circuit breaker R10 and the power supply unit P3 (denoted as 4V_2).

After generating data related to the above connection configuration, the code generation unit 23 stores the data in the code DB 14 (FIG. 1).

The connection of each element included in the range other than the power supply system will be described later.

An example of the element list of the relay logic circuit shown in FIG. 7 will be described with reference to FIG. 9. FIG. 9 is a diagram showing the element list of the relay logic circuit shown in FIG. 7. In FIG. 9, an element list for storing data on elements and connection relationships between the elements is described. The element list includes items of No, Device, common, b-contact, and a-contact. In the item of No, the data on elements stored in this table are grouped into each element, and numbers for identification in units of groups are stored. The item of No may be omitted. The item of Device stores data for identifying each element forming the relay logic circuit 2A. For example, the data for identifying each element may be associated with the symbol described in the connection diagram of the relay logic circuit 2A, the component name in the component table, and the like. The item of common stores data for identifying the connection line connected to the first end, when the first end among a pair of terminals included in each element is set to the high-potential side. The items of b-contact and a-contact are for identifying whether each element is in a conductive state (ON state) or in a cutoff state (OFF state) in normal time. In the item of the b-contact and the a-contact, data for identifying the connection line connected to the second end of the pair of terminals of the element is stored in either the item of the b-contact or the item of the a-contact. The "common" in the relay logic circuit 2A of the present embodiment is that the first ends of one or a plurality of contacts provided in each relay and each switch are connected to the high-potential side, which is a common potential. Such a connection form of the first end is referred to as a "common" connection which means being commonly connected. In the present embodiment, the term "common" or "common part" with respect to the contact of a switch or a relay indicates the terminal (first end) disposed on the high-potential side of the contact of the switch or the relay.

The element list (Dev table) stores, in association with the element and the connection line with each other, data related to an element or a connection line connected to the first end of the element or the connection line and an element or a connection line connected to the second end of the element or the connection line.

The following information can be read from the relay logic circuit shown in FIG. 7. The information is organized in the form of this element list. For the description of the element list, FIG. 10 described above is referred to.

This element list includes information (data) on the elements respectively numbered 1 to 13. The connection relationship of each element is as follows.

The relay R1, which is the first element, has a first end connected to the connection line Line113 (indicated as "113" in the drawings) and a second end connected to the ground electrode (indicated as "G_100E1" in the drawings).

The relay R2, which is the second element, has a first end connected to the connection line Line111 (indicated as "111" in the drawings) and a second end connected to the ground electrode.

The relay R3, which is the third element, has a first end connected to the connection line Line213 (indicated as "213" in the drawings) and a second end connected to the ground electrode.

The relay R4, which is the fourth element, has a first end connected to the connection line Line211 (indicated as "211" in the drawings) and a second end connected to the ground electrode.

The switch SW_1, which is the fifth element, has a first end connected to the connection line Line112 (indicated as "112" in the drawings) and a second end connected to the connection line Line113.

The switch SW_2, which is the sixth element, has a first end connected to the connection line Line111 and a second end connected to the connection line Line112.

The diode Diode_121, which is the seventh element, has a first end connected to the Line121 (indicated by "121" in the drawings) and a second end connected to the connection line Line111.

The switch SW_3, which is the eighth element, has a first end connected to the connection line VOL_100_1 and a second end connected to the connection line Line121, among the connection lines connected to the power supply unit P1.

The switch SW_4, which is the ninth element, has a first end connected to the connection line Line212 (indicated as "212" in the drawings) and a second end connected to the connection line Line213.

The switch SW_5, which is the tenth element, has a first end connected to the connection line Line211 and a second end connected to the connection line Line212.

The diode Diode_221, which is the eleventh element, has a first end connected to the Line221 (indicated by "221" in the drawings) and a second end connected to the connection line Line211.

The switch SW_6, which is the twelfth element, has a first end connected to the connection line VOL_100_2 and a second end connected to the connection line Line221, among the connection lines connected to the power supply unit P1.

The contactor C_1, which is the thirteenth element, has a first end connected to the connection line Line111 and a second end connected to the connection line Line211.

Similar to the above, the information regarding the elements in the relay logic circuit is arranged from the fourteenth rows. Here, the description is omitted.

Among the above-described first to thirteenth elements, the diode Diode_121 which is the seventh element, the diode Diode_221 which is the eleventh element, and the contactor C_1 which is the thirteenth element are b-contacts, and elements other than the above elements are a-contacts. Here, a supplementary explanation will be given regarding the use of the diode as the b-contact. The diode conducts a current when it is in a forward bias state, but cuts off the current when it is in a reverse bias state. The diode in the relay logic circuit is arranged to be forward biased, and when the path associated with the diode is in a conductive state, a current flows in the diode, so that it is treated as a b-contact.

(Generation of Logical Expression for Disconnection Diagnosis)

Figure 10:
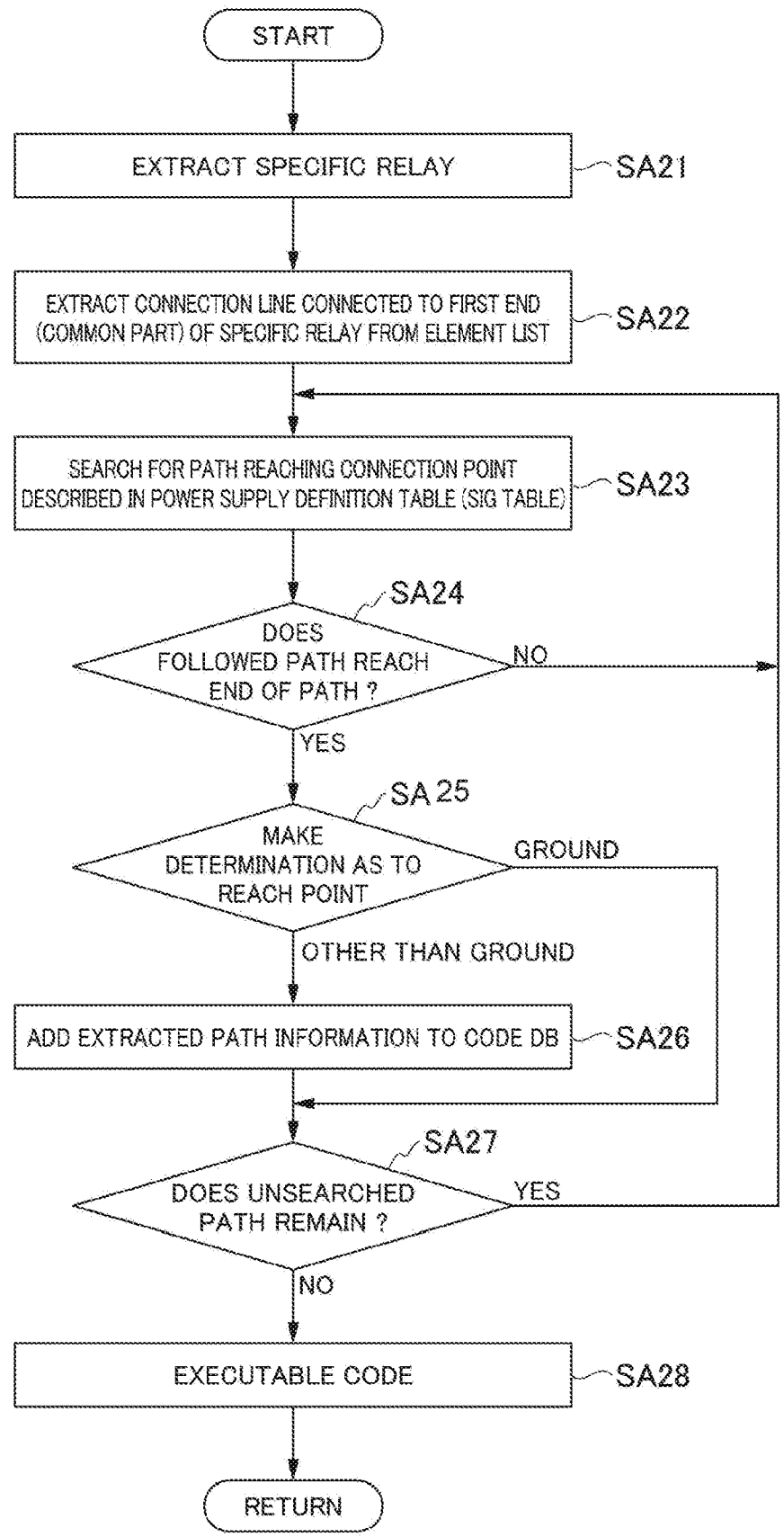
FIG. 10 is a flowchart of a process of generating a logical expression for disconnection diagnosis according to the present embodiment.

Next, with reference to FIG. 10 and the above-described FIG. 9, the search for the path for the disconnection diagnosis and the generation of the logical expression will be described. FIG. 10 is a flowchart of a process of generating a logical expression for disconnection diagnosis according to the present embodiment. Hereinafter, a path for disconnection diagnosis is referred to as a path.

First, the logic generation unit 27 extracts a specific relay from the element list of the element information DB 15 (step SA21). For example, the logic generation unit 27 determines the specific relay as the relay R1.

Next, the logic generation unit 27 extracts the connection line connected to the first end (common part) of the extracted specific relay from the element list (step SA22). For example, in the case of the relay R1, it is the connection line Line113.

Next, the logic generation unit 27 searches for a path from the connection line to the connection point described in the power supply definition table (Sig table) (step SA23).

Next, the logic generation unit 27 determines whether or not the followed path reaches the end of the path (step SA24). The end of the path is, for example, the ground (G_100E1) or the connection point described in the power supply definition table (Sig table). When following the path, in a case where the followed path does not reach the end of the path, that is, in a case where the extracted connection point does not reach the ground (G_100E1) or the connection point described in the power supply definition table (Sig table), the logic generation unit 27 repeats the processes from step SA23.

When following the path, in a case where the followed path reaches the end of the path, that is, in a case where the extracted connection point reaches the ground (G_100E1) or the connection point described in the power supply definition table (Sig table), the logic generation unit 27 makes a determination as to the reach point (step SA25).

When the reach point is the ground (G_100E1), the logic generation unit 27 proceeds to the next step SA27 without adding information on the extracted path to the code DB 14.

When the reach point is the connection point described in the power supply definition table (Sig table), the logic generation unit 27 adds the extracted path information to the code DB 14 (step SA26). In addition, when the path to be added is one of the plurality of paths starting from the specific relay, the logic generation unit 27 connects the logical expressions of the other paths and the logical expression of the path extracted this time by the OR operator to obtain a logical sum.

After ending the process of step SA26 or when determining that the reach point is the ground (G_100E1) in the determination of step SA25, the logic generation unit 27 determines whether or not an unsearched path starting from the specific relay remains (step SA27). When the unsearched path remains, the logic generation unit 27 switches the target path to the next path and executes the process from step SA23.

When no unsearched path remains, the logic generation unit 27 associates one or a plurality of logical expressions (logics) of paths with each other, edits the associated logical expressions into an evaluation expression, and registers the evaluation expression in the evaluation expression DB. The code generation unit 23 creates an executable code, based on the logical expression created in the above process (step SA28), and ends the series of processes shown in FIG. 10.

(Automatic Creation of Logical Expression for Unintentional Contact Diagnosis)

Next, a more specific example of automatic creation of a logical expression for unintentional contact diagnosis to which the procedure of FIG. 10 is applied will be described with reference to FIG. 9 described above.

Step SA31:

First, the logic generation unit 27 determines the variable name of the connection line connected to the first end (common part) of the relay R1 by the following method. The logic generation unit 27 reads the information on the connection line connected to the first end (common part) of the relay R1 from the field of the common part of the element information DB15. With respect to the variable for the basic logic, the logic generation unit 27 registers the variable with the connection line name with "DC_" added as the variable name, as the variable of the logical expression. For example, when the data read from the field of the common part in the first row of the element information DB 15 is (113), the logic generation unit 27 attaches "DC_" to (113) of the data, and uses it as the variable name of the variable for the logic including the unintentional contact. Further, with respect to the variable for the logic including the unintentional contact, the logic generation unit 27 registers the variable having the name as the variable of the logical expression.

The logic generation unit 27 adds "Line_" to (113) of the data to make the variable name of the variable for the basic logic. Further, with respect to the variable for the basic logic, the logic generation unit 27 registers the variable having the name as the variable of the logical expression.

Thus, the basic logic becomes Expression (14), and the logic including unintentional contact becomes Expression (15).

$$R1 = DC\_113 \tag{14}$$

$$R1 = \text{Line}113 \tag{15}$$

Step SA32:

Next, the logic generation unit 27 extracts a device whose item of common, b-contact or a-contact is (113), from devices (elements) other than the relay R1, and adds the extracted device to the basic logic. For example, the logic generation unit 27 extracts (SW_1).

Thus, the basic logic becomes Expression (16). Here, there is no change in logic including unintentional contact.

$$R1 = DC\_113 \ \& \ SW\_1 \tag{16}$$

Step SA33:

Next, the logic generation unit 27 reads the information on the contact of the switch SW_1 other than (113). In the above case, the contact is (112). "DC_" is added to the read string and the result is added to the basic logic.

Note that the logic generation unit 27 adds, as the logic including unintentional contact, the logic obtained by removing the variable with the character "DC_" added from the basic logic at this time and the connection line connected by the AND operator.

Thus, the basic logic becomes Expression (17), and the logic including unintentional contact becomes Expression (18).

$$R1=DC\_113 \ \& \ SW\_1 \ \& \ DC\_112 \tag{17}$$

$$R1=SW\_1 \ \& \ Line \ 112 \tag{18}$$

Step SA34:

Next, the logic generation unit 27 extracts a device whose item of common, b-contact, or a-contact is (112) from among other devices.

Thus, the basic logic becomes Expression (19). Here, there is no change in logic including unintentional contact.

$$R1=DC\_113 \ \& \ SW\_1 \ \& \ DC\_112 \ \& \ SW\_2 \tag{19}$$

Step SA35:

Next, the logic generation unit 27 reads information regarding the contact of SW_1 other than (113). The information is (111). Since this (111) indicates a connection point included in the power supply definition table (Sig table), the logic generation unit 27 ends the search for this path.

Thus, the basic logic becomes Expression (20), and the logic including unintentional contact becomes Expression (21).

$$R1=DC\_113 \ \& \ SW\_1 \ \& \ DC\_112 \ \& \ SW\_2 \ \& \ Line \ 111 \tag{20}$$

$$R1=SW\_1 \ \& \ Line \ 112 \tag{21}$$

(Generation of Connection Point Information)

Next, automatic creation of connection point information will be described with reference to FIGS. 11 and 12.

FIG. 11 is a diagram for explaining a process of extracting the same connection point according to the present embodiment.

For example, a case where the connection line Line111 is defined as a connection point will be described as an example. There are a plurality of elements in which the connection line Line111 (denoted as "111" in FIG. 11) is described in the item of common and the item of b-contact. For example, the elements connected to the connection line Line111 are the relay R2 which is the second element, the switch SW_2 which is the sixth element, the diode Diode_121 which is the seventh element, and the contactor C_1 which is the thirteenth element. Other connection lines can be extracted by the same method as above.

FIG. 12 is a diagram for explaining an automatic creation process of connection point information in the present embodiment.

Step SA41:

First, the logic generation unit 27 adds the connection point (111_temp) to the logical expression of the basic logic in the evaluation expression. Thus, the basic logic becomes Expression (22).

$$Line \ 111=111\_temp \tag{22}$$

Step SA42:

Next, the logic generation unit 27 extracts a device for which (111) is set in the item of common, b-contact or a-contact of the device. For example, (111) is set in the common item of the thirteenth device (C_1). The b-contact item (211) which is a connection point different from the connection point Line111 on the common side of the device (C_1) is extracted. The logic generation unit 27 adds the logical expression regarding this path to the logical expression of the basic logic of the above Expression (22) by the OR operator "|". Thus, the basic logic becomes Expression (23).

$$Line \ 111=111\_temp|(!C\_1 \ \& \ Line \ 211) \tag{23}$$

Step SA43:

Next, since the end point of the above path is the connection point, the logic generation unit 27 ends the search for this path.

The contactor C_1, which is the thirteenth element, has a first end connected to the connection line Line111 and a second end connected to the connection line Line211, and thus the above Expression (23) is obtained.

Step SA44:

Next, the logic generation unit 27 extracts other devices for which (111) is set in the item of common, b-contact or a-contact as in the above. For example, (111) is set in the item of the b-contact of the seventh device (Diode_121). The logic generation unit 27 extracts the common item (121) which is a connection point different from the b-contact of the device (Diode_121). When (121) is not the connection point stored in the power supply definition table (Sig table), the logic generation unit 27 adds (121) as "DC_121" to the basic logic. The logic generation unit 27 adds the logical expression regarding this path to the logical expression of the basic logic of the above Expression (23) by the OR operator "|". Thus, the basic logic becomes Expression (24).

$$Line \ 111=111\_temp|(!C\_1 \ \& \ Line \ 211)|(!Diode\_121) \ \& \ (DC\_121) \tag{24}$$

In addition to the basic logic described above, the logic generation unit 27 registers as a logic including unintentional contact, the logic obtained by removing "DC_" from the basic logic at this time and the connection line connected by the AND operator. Thus, the logic including unintentional contact becomes Expression (25).

$$Line \ 111=(!Diode\_121) \ \& \ Line \ 121 \tag{25}$$

Step SA45:

Next, the logic generation unit 27 extracts a device for which (121) is set in the item of b-contact or a-contact from among other devices. For example, (121) is set in the item of a contact of the eighth device (SW_3). The logic generation unit 27 extracts common item (VOL_100_1) which is a connection point different from the a-contact of the device (SW_3).

Since (VOL_100_1) is the connection point stored in the power supply definition table (Sig table), the logic generation unit 27 adds (VOL_100_1) so as to take the logical sum of the basic logics extracted so far. Thus, the basic logic becomes Expression (26).

$$Line \ 111=111\_temp|(!C\_1 \ \& \ Line \ 211)|\{(!Diode\_121) \ \& \ (DC\_121) \ \& \ SW\_3 \ \& \ VOL\_100\_1\} \tag{26}$$

Since (VOL_100_1) is the connection point stored in the power supply definition table (Sig table), the logic generation unit 27 ends the search of this path here. There is no addition to the logic, including unintentional contact of this path.

Step SA46:

Next, the logic generation unit 27 extracts a device for which (111) is set in the item of common, b-contact or a-contact from among other devices. For example, (111) is set in the common item of the sixth device (SW_2). The logic generation unit 27 extracts the a-contact item (112) which is a connection point different from the common of the device (SW_2). Since this (112) is not the connection point stored in the power supply definition table (Sig table), the logic generation unit 27 converts (112) into "DC_112" and makes this the variable of the basic logic. The logic generation unit 27 adds the logical expression regarding this path to the logical expression of the basic logic shown in the above Expression (25) by the OR operator "|". Thus, the basic logic becomes Expression (27).

$$\text{Line } 111 = 111\_temp|(!C\_1 \& \text{ Line } 211)|\{(!Diode\_121) \& (DC\_121) \& SW\_3 \& VOL\_100\_1\}|SW\_2 \& DC\_112 \qquad (27)$$

Step SA47:

Further, the logic generation unit 27 adds (112) as a variable to the logic including the unintentional contact as described above. The logic including unintentional contact becomes Expression (28).

$$\text{Line } 111 = (!Diode\_121) \& \text{ Line } 121|(SW\_2 \& 112) \qquad (28)$$

Step SA48:

Next, the logic generation unit 27 extracts a device for which (112) is set in the item of common from among other devices. For example, (112) is set in the common item of the fifth device (SW_1). The logic generation unit 27 extracts (113) of the item of a-contact which is a connection point different from the common of the device (SW_1). Since this (113) is not the connection point stored in the power supply definition table (Sig table), the logic generation unit 27 converts (113) into "DC_113" and adds "DC_113" to the logical expression of the basic logic of the above Expression (27). Thus, the basic logic becomes Expression (29).

$$\text{Line } 111 = 111\_temp|(!C\_1 \& \text{ Line } 211)|\{(!Diode\_121) \& (DC\_121) \& SW\_3 \& VOL\_100\_1\}|SW\_2 \& DC\_112 \& SW\_1 \& DC\_113 \qquad (29)$$

Step SA49:

Thus, the logic including unintentional contact becomes Expression (30).

$$\text{Line } 111 = (!Diode\_121) \& \text{ Line } 121|(SW\_2 \& \text{ Line } 112)|(SW\_2 \& SW\_1 \& \text{ Line } 113) \qquad (30)$$

Step SA50:

Next, the logic generation unit 27 extracts a device for which (113) is set in the item of common, b-contact or a-contact from among other devices. For example, (113) is set in the common item of the first device (R1). The logic generation unit 27 extracts the a-contact item ("G_100E1") which is a connection point different from the common of the device (R1). Since the ground ("G_100E1") is reached, the logic generation unit 27 deletes again the basic logic generated in steps SA46 to SA49. The logic generation unit 27 leaves Expression (30) generated up to step SA49 as the unintentional contact logic. Thus, the basic logic becomes Expression (31).

$$\text{Line } 111 = 111\_temp|(!C\_1 \& \text{ Line } 211)|\{(!Diode\_121) \& (DC\_121) \& SW\_3 \& VOL\_100\_1\} \qquad (31)$$

Step SA51:

Thus, the logic including unintentional contact becomes Expression (32).

$$\text{Line } 111 = (!Diode\_121) \& \text{ Line } 121|(SW\_2 \& \text{ Line } 112)|(SW\_2 \& SW\_1 \& \text{ Line } 113) \qquad (32)$$

In addition to the above, the relay R2 which is the second element has the first end connected to the connection line Line111, and the second end connected to the ground electrode ("G_100E1"). This path is not effective as a path for applying a predetermined potential for driving the relay to the connection line Line111, and thus is not included in the search target.

An example of the logical expression generated by the above process will be described with reference to FIG. 13. FIG. 15 is a diagram showing a logical expression in the present embodiment.

FIG. 13(*a*) is a logical expression of the relay R1, and describes the logical expression shown in Expression (33).

The expression in the upper frame of FIG. 13(*a*) is a logical expression in which the disconnection of the connection line is added to the condition, and the expression in the lower frame is a logical expression in which unintentional contact is added to the condition. The upper expression and the lower expression are connected by an OR operator. "&" is a AND operator, and "|" is an OR operator. The same applies hereinafter.

$$R1 = ((DC\_113) \& SW\_1 \& (DC\_112) \& SW\_2 \& \text{Line}111)|(\text{Line}113)|(SW\_1 \& \text{Line}112) \qquad (33)$$

In Expression (33), (DC_113) and (DC_112) are variables corresponding to the connection lines Line113 and Line112 and enable determination when a disconnection occurs. "SW_1" is a variable corresponding to the switch SW_1, and "SW_2" is a variable corresponding to the switch SW_2. (Line111), (Line 113), and (Line112) are variables corresponding to the connection lines Line111, Line112, and Line113. (Line111) is defined by the expression described later.

According to this Expression (33), it can be known that the output of the relay R1 is conductive, in a case where the connection lines Line113 and Line112 have no disconnection and the switch SW_1 and the switch SW_2 are in a conductive state, a case where there is unintentional contact of the connection line Line113, or a case where the switch SW_1 is in a conductive state and there is unintentional contact of the connection line Line112.

FIG. 13(*b*) is a logical expression of the relay R2, and describes the logical expression shown in Expression (34).

$$R2 = (\text{Line } 111)|(!Diode\_121 \& \text{Line}121) \qquad (34)$$

In Expression (34), (!Diode_121) is a variable corresponding to the diode Diode_121. The "!" mark indicates that the contact is a b-contact. The element of a variable with "!" has a false value ("1") in a steady state, and has a true value ("0") when a predetermined condition is satisfied. This "!" may be treated as a negation operator.

They are variables corresponding to the connection lines Line113 and Line112, and enable determination when a disconnection occurs. "SW_1" is a variable corresponding to the switch SW_1, and "SW_2" is a variable corresponding to the switch SW_2.

According to this Expression (34), it can be known that the output of the relay R2 is conductive, in either a case where the connection line Line111 had no disconnection and the value of the variable Line111 is "1", or a case where the diode Diode_121 is in a conductive state and there is unintentional contact of the connection line Line121.

FIG. 13(*c*) is a logical expression of the relay R3, and describes the logical expression shown in Expression (35).

$$R3 = ((DC\_213) \& SW\_4 \& (DC\_212) \& SW\_5 \& \text{Line } 211)|(\text{Line}213)|(SW\_4 \& \text{Line}212) \qquad (35)$$

According to this Expression (35), it can be known that the output of the relay R3 is conductive, in either a case where the connection lines Line213 and Line212 have no disconnection, the switch SW_4 and the switch SW_5 are in a conductive state, and the value of the variable Line111 is "1", a case where there is unintentional contact of the variable Line213, or a case where the switch SW_4 is in a conductive state and there is unintentional contact of the connection line Line213.

FIG. 13(*d*) is a logical expression of the relay R4, and describes the logical expression shown in Expression (36).

$$R4=(\text{Line211})|(!\text{Diode\_221 \& Line221}) \quad (36)$$

According to this Expression (36), it can be known that the output of the relay R4 is conductive, in either a case where the value of the variable Line111 is "1", or a case where the diode Diode_121 is in a conductive state and there is unintentional contact of the connection line Line221.

FIG. 13(*e*) is a logical expression defining the connection line Line111, and describes the logical expression shown in Expression (37).

$$\begin{aligned}\text{Line111}=&\text{Line111\_temp}|(!C\_1 \text{ \& Line211})|(!C\_1 \text{ \&} \\ &(DC\_211) \text{ \& !Diode\_221 \&} (DC\_221) \text{ \& } SW\_6 \\ &\text{\& VOL\_100\_2})|(!\text{Diode\_121 \&} (DC\_121) \text{ \&} \\ &SW\_3 \text{ \& VOL\_100\_1})|(SW\_2 \text{ \& } SW\_1 \text{ \& Line} \\ &113)|(SW\_2 \text{ \& Line112})|(!\text{Diode\_121 \&} \\ &\text{Line121}) \quad (37)\end{aligned}$$

In Expression (37), the variable Line111_temp indicates the current value of the variable Line111. After the operation of the above expression, the value of the operation result is updated.

According to the Expression (37), it can be seen that the value of the variable Line111 corresponding to the connection line Line111 becomes "1" in any of the following cases, and the line is conductive.

When the current value of the variable Line111 is "1".

When the contactor C_1 is in a conductive state and the value of the connection line Line211 is "1".

When the contactor C_1 is in a conductive state, there is no disconnection in the connection lines Line211 and Line221, the diode Diode_221 and the switch SW_6 are in a conductive state, and the value of the connection line VOL_100_2 is "1".

When the switches SW_2 and SW_1 are in a conductive state and there is unintentional contact by the connection line Line221.

When the switch SW_2 is in a conductive state and there is unintentional contact by the connection line Line112.

When the diode Diode_121 is in a conductive state and there is unintentional contact by the connection line Line221.

FIG. 13(*f*) is a logical expression of the relay R4, and describes the logical expression shown in Expression (38).

$$\begin{aligned}\text{Line211}=&(\text{Line211\_temp})|(!\text{Diode\_221 \&} (DC\_221) \\ &\text{\& } SW\_6 \text{ \& VOL\_100\_2})|(!C\_1 \text{ \& Line111})| \\ &(!C\_1 \text{ \&} (DC\_111) \text{ \& !Diode\_121 \&} (DC\_121) \\ &\text{\& } SW\_3 \text{ \& VOL\_100\_1})|(SW\_5 \text{ \& } SW\_4 \text{ \&} \\ &\text{Line213})|(SW\_5 \text{ \& Line212})|(!\text{Diode\_221 \&} \\ &\text{Line221}) \quad (38)\end{aligned}$$

In Expression (38), the variable Line211_temp indicates the current value of the variable Line211. After the operation of the above expression, the value of the operation result is updated.

According to the Expression (38), it can be seen that the value of the variable Line211 corresponding to the connection line Line211 becomes "1" in any of the following cases, and the line is conductive.

When the current value of the variable Line211 is "1".

When there is no disconnection in the connection line Line211 and the diode Diode_221 and the switch SW_6 are in a conductive state, and the value of the connection line VOL_100_2 is "1".

When the contactor C_1 is in a conductive state, there is no disconnection in the connection lines Line111 and Line121, the diode Diode_121 and the switch SW_3 are in a conductive state, and the value of the connection line VOL_100_2 is "1".

When the switches SW_5 and SW_4 are in a conductive state and there is unintentional contact by the connection line Line213.

When the switch SW_5 is in a conductive state and there is unintentional contact by the connection line Line212.

In any case where the diode Diode_221 is in a conductive state and there is unintentional contact by the connection line Line221.

According to the above aspect, the verification-processing device includes an acquisition unit that acquires a circuit logic model represented by an evaluation expression represented by a logical expression taking as variables, variables corresponding to a relay, an element, and a connection line that form a relay logic circuit of a verification target, the evaluation expression including at least a logical expression for a case where a failure event occurs in the relay logic circuit; and a determination unit that determines whether there is a state combination leading to the unsafe state, based on the circuit logic model, even when a failure event occurs in the element or the connection line, thereby verifying that the safety is assured even when a failure event occurs in the relay logic circuit.

The above embodiments are applicable to various systems. The safety requirements of various systems are increasing year by year. On the other hand, the control of the system is complicated. In such a case, by applying the method of the above-described embodiment, it is possible to apply a model inspection method for comprehensive verification including verification in the case where a failure event occurs.

Particularly in the case of the second embodiment, it is not necessary to prepare in advance the information on the relay logic circuit, for example, the information for creating the state transition model necessary for the model inspection as described in the programming language (logic circuit description language such as VHDL or Verilog, C language, JAVA (registered trademark), or the like). In this case, the information on the relay logic circuit is generated by the verification-processing device 1A, based on the list shown in FIGS. 8 and 10.

Note that FIG. 1 and FIG. 6 described above are schematic block diagrams showing the configuration of a computer according to at least one embodiment. The computer includes a processor, a main memory, a storage, and an interface, which are not shown.

The verification-processing device described above is implemented in a computer. The operation of each processing unit described above is stored in the storage in the form of a program. The processor reads the program from the storage, expands it in the main memory, and executes the process according to the program. The processor secures a storage area corresponding to each of the storage units described above in the main memory in accordance with the program.

Examples of the storage include a hard disk drive (HDD), a solid state drive (SSD), a magnetic disk, a magneto-optical disk, a compact disc read only memory (CD-ROM), a digital versatile disc read only memory (DVD-ROM), and a semiconductor memory. The storage may be an internal medium directly connected to the bus of the computer, or may be an external medium connected to the computer through the interface or a communication line. Further, when this program is delivered to the computer through a communication line, the computer receiving the delivered program may develop the program in the main memory and execute the above process. In at least one embodiment, the storage is a non-transitory tangible storage medium.

Further, the program may be for realizing a part of the above-described functions. Further, the program may be a so-called differential file (differential program) which realizes the above-described function in combination with other programs already stored in the storage.

The present invention is not limited to the configurations of the above-described embodiments, and design changes can be made without departing from the spirit of the invention.

For example, in the above-described embodiments, the symbolic model verifier (SMV) code is used as an example of the code. However, the code is not limited to this, and a code or a programming language of another standard may be adopted.

INDUSTRIAL APPLICABILITY

According to the above-described verification-processing device, logic-generating device, and verification-processing method, it is possible to verify the safety when a failure event occurs in a relay logic circuit using a relay.

REFERENCE SIGNS LIST 1, 1A Verification-processing device
10, 10A Storage unit
11 Evaluation expression DB
12 Evaluation condition DB
13 Inspection expression DB
14 Code DB
15 Element information DB
16 Signal information DB
20, 20A Control unit
21, 21A Analysis data setting unit
22 Inspection expression setting unit
23 Code generation unit
24 Acquisition unit
25 Analysis processing unit
26 Display control unit
27 Logic generation unit
2, 2A Relay logic circuit

The invention claimed is:

1. A verification-processing device comprising:
an acquisition unit that is configured to acquire a circuit logic model represented by an evaluation expression represented by a logical expression taking, as variables, variables corresponding to a relay, an element, and a connection line that form a relay logic circuit of a verification target, the evaluation expression including at least the logical expression for a case where a failure event occurs in the relay logic circuit; and
a determination unit that is configured to determine a logical state of an output of the relay when a failure event occurs in the element or the connection line, based on the circuit logic model.

2. The verification-processing device according to claim 1,
wherein in the variables of the logical expression, conductive states of an element and a connection line on a path of the verification target are indicated by positive logic, and the logical expression when the failure event occurs includes a logical expression that indicates an AND operation of a variable indicating the element on the path of the verification target and a variable indicating the connection line on the path of the verification target.

3. The verification-processing device according to claim 1,
wherein the evaluation expression of the relay included in the relay logic circuit of the verification target is described such that an operation result of the evaluation expression of the relay is a value of the variable of the relay.

4. The verification-processing device according to claim 3,
wherein in the variables of the logical expression, conductive states of an element and a connection line on a path of the verification target are indicated by positive logic, and
wherein the evaluation expression of the relay includes:
a first expression and a second expression; and
an OR operation of the first expression and the second expression,
wherein the first expression includes an AND operation of a variable indicating the element and a variable indicating the connection line on the path provided with the relay, and
wherein the second expression uses elements and connection lines of the path provided with the relay as analysis targets, the elements being at a point where a short circuit can occur on the path or the elements being on a path between connection lines and the relay, and includes an AND operation of variables indicating the elements which are the analysis targets and variables indicating the connection lines which are the analysis targets.

5. The verification-processing device according to claim 4,
wherein the path provided with the relay is a path formed so as to be connectable between a power supply line to which a control voltage of the relay is applied and a ground electrode for the power supply line.

6. The verification-processing device according to claim 1, further comprising:
a logic generation unit that is configured to generate the circuit logic model, based on an element list which associates the element and the connection line with each other and which stores data related to an element or a connection line connected to a first end of the element or the connection line and an element or a connection line connected to a second end of the element or the connection line.

7. The verification-processing device according to claim 6,
wherein the logic generation unit generates the circuit logic model, based on a power supply definition table that stores data indicating a relationship between a connection point of a power supply line to which a control voltage of the relay is applied and a power supply related to the power supply line.

8. A logic-generating device for determining a logical state of an output of a verification target using the verification-processing device according to claim 1, comprising:

a logic generation unit that is configured to generate the circuit logic model represented by the evaluation expression based on data on a list showing a mutual connection relationship between the element and the connection line, the evaluation expression being represented by a logical expression taking, as variables, the relay, the element, and the connection line that form the relay logic circuit of the verification target, the evaluation expression including at least the logical expression for a case where the failure event occurs in the relay logic circuit.

9. A verification-processing method comprising the steps of:

acquiring a circuit logic model represented by an evaluation expression represented by a logical expression taking as variables, variables corresponding to a relay, an element, and a connection line that form a relay logic circuit of a verification target, the evaluation expression including at least the logical expression for a case where a failure event occurs in the relay logic circuit; and determining a logical state of an output of the relay when a failure event occurs in the element or the connection line, based on the circuit logic model.

* * * * *